United States Patent
Lerner et al.

(10) Patent No.: US 7,962,846 B2
(45) Date of Patent: Jun. 14, 2011

(54) ORGANIZATION OF ANNOTATED CLIPPING VIEWS

(75) Inventors: Matthew Lerner, Seattle, WA (US); William Mak, Seattle, WA (US); Kevin Paulson, Redmond, WA (US); Jeffrey W. Pettiross, Seattle, WA (US); Emily Rimas, Seattle, WA (US); Gerhard A. Schobbe, Bellevue, WA (US); Judy Tandog, Seattle, WA (US); William H. Vong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 10/777,046

(22) Filed: Feb. 13, 2004

(65) Prior Publication Data

US 2005/0183004 A1    Aug. 18, 2005

(51) Int. Cl.
*G06F 3/048* (2006.01)
*G06F 17/40* (2006.01)
*G06F 17/28* (2006.01)

(52) U.S. Cl. ........ 715/230; 715/232; 715/233; 715/243; 715/246; 715/247

(58) Field of Classification Search .............. 707/2, 102; 715/500, 513, 512, 230, 232, 233, 243, 246, 715/247, 24; 382/218
See application file for complete search history.

(56) References Cited

U.S. PATENT DOCUMENTS

| | | | |
|---|---|---|---|
| 5,592,568 A * | 1/1997 | Wilcox et al. | 382/218 |
| 6,279,014 B1 | 8/2001 | Schilit et al. | |
| 6,519,603 B1 * | 2/2003 | Bays et al. | 707/102 |
| 6,529,215 B2 | 3/2003 | Golovchinsky et al. | |
| 6,551,357 B1 * | 4/2003 | Madduri | 715/512 |
| 6,565,611 B1 | 5/2003 | Wilcox et al. | |
| 6,582,475 B2 | 6/2003 | Graham et al. | |
| 6,624,826 B1 | 9/2003 | Balabanovic | |
| 6,658,623 B1 | 12/2003 | Schilit et al. | |
| 6,675,352 B1 | 1/2004 | Osaki et al. | |

(Continued)

FOREIGN PATENT DOCUMENTS

EP      0 902 379 A2    3/1999

OTHER PUBLICATIONS

Hardock et al, "A Marking Based Interface for Collaborative Writing", publisher: ACM, published: Nov. 5, 1993, pp. 1-8.*

(Continued)

*Primary Examiner* — Stephen S Hong
*Assistant Examiner* — Wilson Tsui
(74) *Attorney, Agent, or Firm* — Shook, Hardy & Bacon L.L.P.

(57) ABSTRACT

A system and process for handling clips with annotations is provided. A user annotates a document. The system gathers context information regarding the clip and displays the clip or clips with annotations to the user. A system for showing clips of content and annotations may include an input for receiving content and annotations, a processor creating a renderable image having the clips with at least one of the clips being a combination of two or more annotations, and an output for outputting the renderable image. A method of displaying clips may include receiving at least two sets of an annotation and related content, filtering the received, combining the filtered output, and displaying a combination of the filtered output.

7 Claims, 11 Drawing Sheets

U.S. PATENT DOCUMENTS

| | | | |
|---|---|---|---|
| 6,687,876 B1 * | 2/2004 | Schilit et al. | 715/512 |
| 6,687,877 B1 | 2/2004 | Sastry et al. | |
| 6,687,878 B1 | 2/2004 | Eintracht et al. | |
| 6,766,494 B1 * | 7/2004 | Price et al. | 715/512 |
| 6,859,909 B1 * | 2/2005 | Lerner et al. | 715/512 |
| 6,909,805 B2 * | 6/2005 | Ma et al. | 382/170 |
| 2002/0049787 A1 * | 4/2002 | Keely et al. | 707/512 |
| 2002/0089551 A1 * | 7/2002 | Hugh et al. | 345/853 |
| 2002/0188630 A1 | 12/2002 | Davis | |
| 2003/0004991 A1 | 1/2003 | Keskar et al. | |
| 2003/0004992 A1 | 1/2003 | Matsui et al. | |
| 2003/0014438 A1 | 1/2003 | Devillers | |
| 2003/0018668 A1 | 1/2003 | Britton et al. | |
| 2003/0046315 A1 | 3/2003 | Feig | |
| 2003/0051214 A1 | 3/2003 | Graham et al. | |
| 2003/0056172 A1 | 3/2003 | Vukelic et al. | |
| 2003/0070139 A1 | 4/2003 | Marshall et al. | |
| 2003/0070140 A1 | 4/2003 | Sneh | |
| 2003/0093757 A1 | 5/2003 | Silverbrook et al. | |
| 2003/0106018 A1 | 6/2003 | Silverbrook et al. | |
| 2003/0106019 A1 | 6/2003 | Silverbrook et al. | |
| 2003/0106020 A1 | 6/2003 | Silverbrook et al. | |
| 2003/0196164 A1 | 10/2003 | Gupta et al. | |
| 2004/0078757 A1 * | 4/2004 | Golovchinsky et al. | 715/512 |
| 2004/0216032 A1 * | 10/2004 | Amitay et al. | 715/500 |

OTHER PUBLICATIONS

Golovchinsky et al , "Hypertext Interaction Revisited", publisher: ACM, published: May 30, 2000, pp. 171-179.*

Golovchinsky et al, Moving Markup: Repositioning Freeform Annotations, publisher: ACM, published: Oct. 27, 2002, pp. 21-29.*

* cited by examiner

ORGANIZATION OF ANNOTATED CLIPPING VIEWS

BACKGROUND OF THE INVENTION

1. Field of the Invention

Aspects of the present invention relate to image processing and information manipulation. More specifically, aspects of the present invention relate to obtaining and using context information related to selected content.

2. Description of Related Art

People mark-up documents. For electronic documents, people commonly print them out and annotate them with highlighters, pens, tape flags, and the like. While a document has significance by itself, the reader having made annotations has effectively indicated which sections are the most relevant to him. These annotations are generally graphical in nature and do not always transition well to a textual equivalent.

In the computing world, however, attempting to capture annotations and related markups in an electronic fashion can be cumbersome. Typical computer systems do not provide an easy interface for capturing and conveying graphically intensive content. Rather, they are optimized for capturing and rendering text. For instance, typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Some computing systems have expanded the input and interaction systems available to a user by allowing the use of a stylus to input information into the systems. The stylus may take the place of both the keyboard (for data entry) as well as the mouse (for control). Some computing systems receive handwritten electronic information or electronic ink and immediately attempt to convert the electronic ink into text. Other systems permit the electronic ink to remain in the handwritten form.

Despite the existence of a stylus, providing a user's annotations and other markups back to a user in an efficient manner is difficult. While one may view thumbnails of a document with annotations, the corresponding annotations and related content is shrunk to fit within each thumbnail. For annotation and markup heavy documents, the thumbnails may be useless. Accordingly, a better solution for providing content to a user is needed.

BRIEF SUMMARY

Aspects of the present invention address one or more of the issues mentioned above, thereby providing a better presentation of annotations and their associated context. Various aspects of the invention may include at least one of combining and filtering with a resulting display of the annotations.

These and other aspects are addressed in relation to the Figures and related description.

DETAILED DESCRIPTION

Aspects of the present invention relate to obtaining and displaying annotations in brief format.

This document is divided into sections to assist the reader. These sections include: characteristics of ink, terms, general-purpose computing environment, annotation and clip handling, processes for handling annotations and clips, clips and links, user interfaces, and data structures.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence of strokes, where each stroke is comprised of a sequence of points. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Terms

Ink—A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level.

Ink object—A data structure storing ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

Document—Any electronic file that has a viewable representation and content. A document may include a web page, a word processing document, a note page or pad, a spreadsheet, a visual presentation, a database record, image files, and combinations thereof.

General-Purpose Computing Environment

Figure 1:
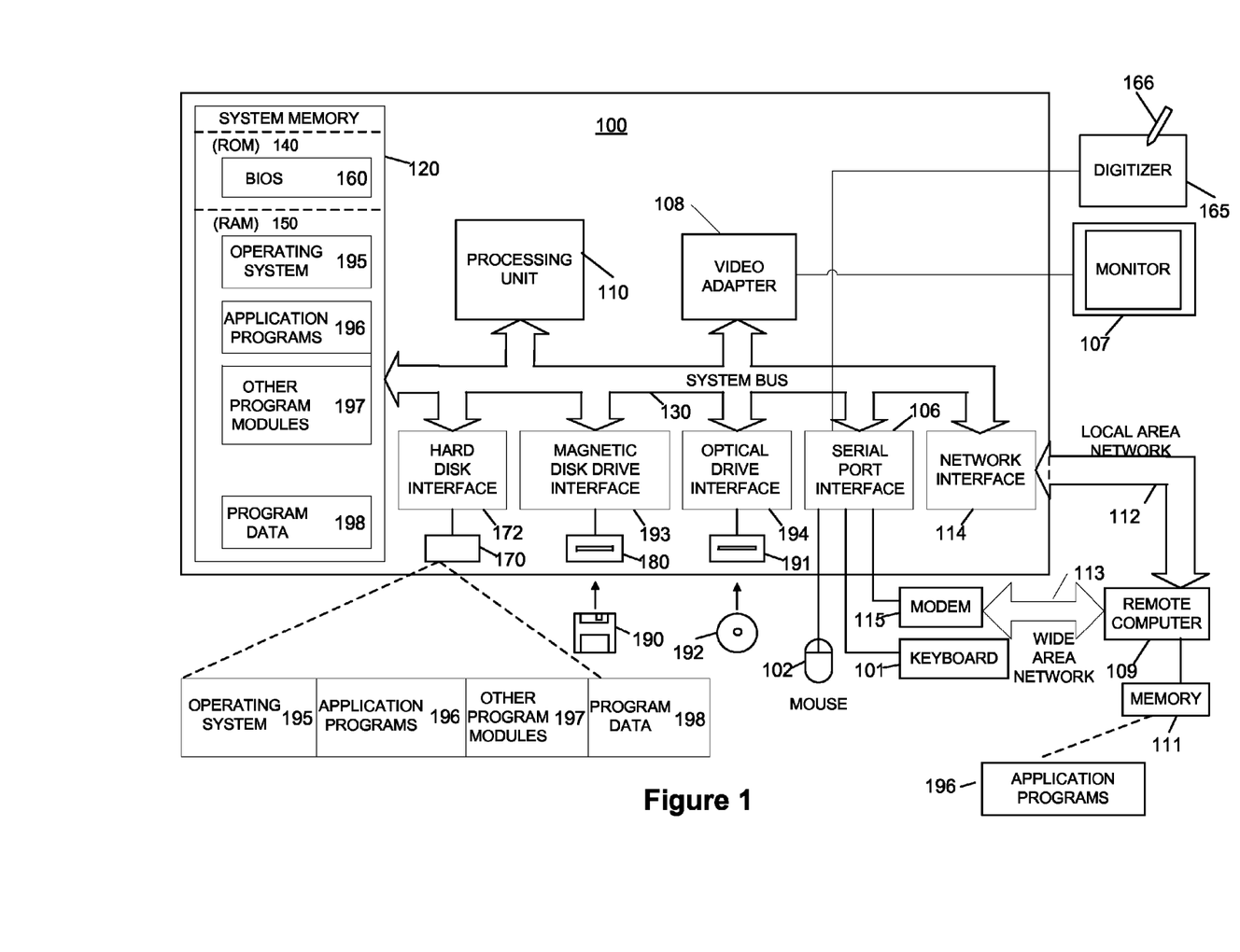
FIG. 1 shows a general-purpose computer supporting one or more aspects of the present invention.

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 172, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. Further, the system may include wired and/or wireless capabilities. For example, network interface 114 may include Bluetooth, SWLan, and/or IEEE 802.11 class of combination abilities. It is appreciated that other wireless communication protocols may be used in conjunction with these protocols or in place of these protocols.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
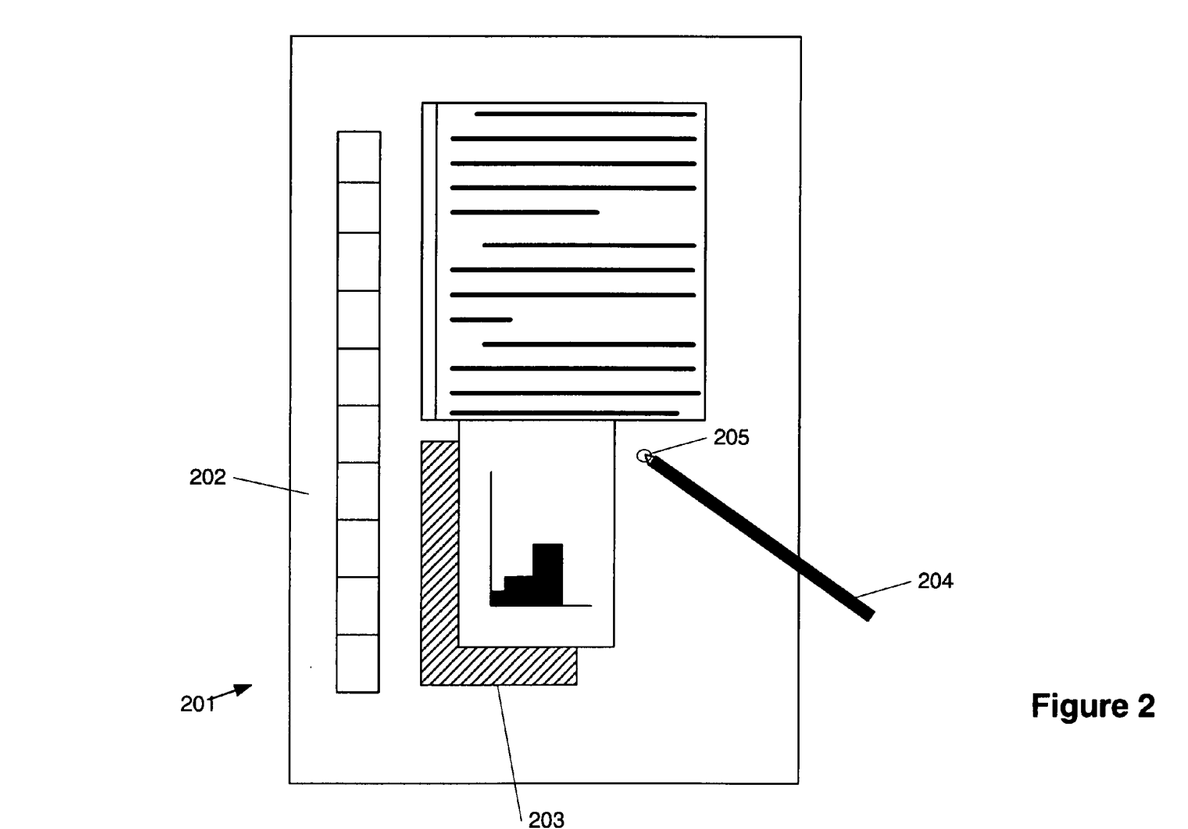
FIG. 2 shows a display for a stylus-based input system according to aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Annotation and Clip Handling

Figure 3:
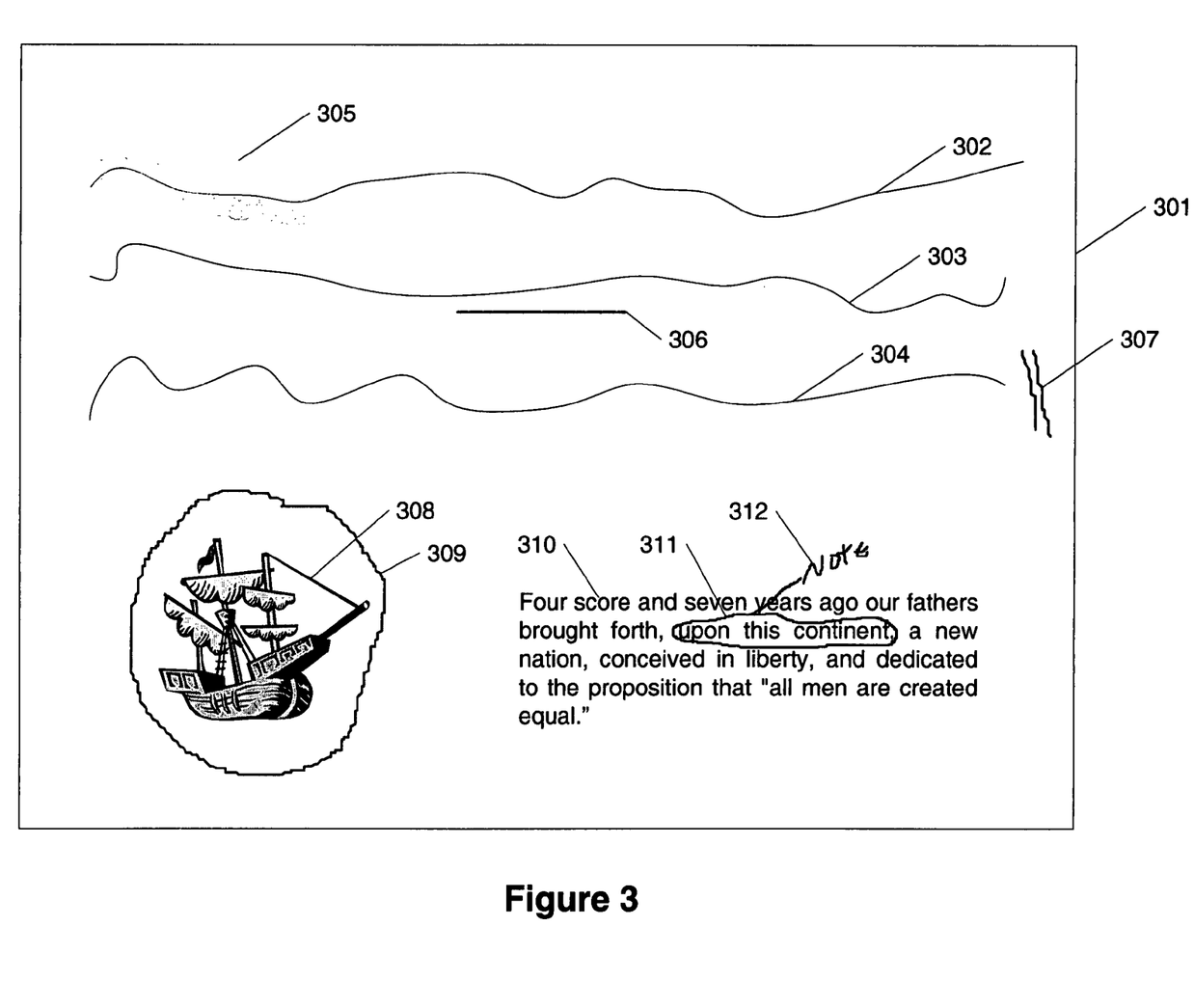
FIG. 3 shows a document with content and various annotations in accordance with aspects of the present invention.

FIG. 3 shows a document with content and various annotations in accordance with aspects of the present invention. Document 301 includes electronic ink represented by ink strokes 302-304, image data represented by picture 308, and text information represented by text 310.

Electronic ink 302 has been highlighted by highlights 305. Highlights 305 may be highlighting ink, electronic ink in a different color that may be used to emphasize other content. Electronic ink 303 has been underlined as represented by underlining 306. Electronic ink 304 has been annotated with vertical bars 307 in the right margin. Image 308 has been encircled by loop 309. Text 310 has been annotated by some words having been circled with loop 311 and an ink note 312 added. Other annotations and underlying document contents are possible. Those shown in FIG. 3 are for illustrative purposes only.

Figure 4:
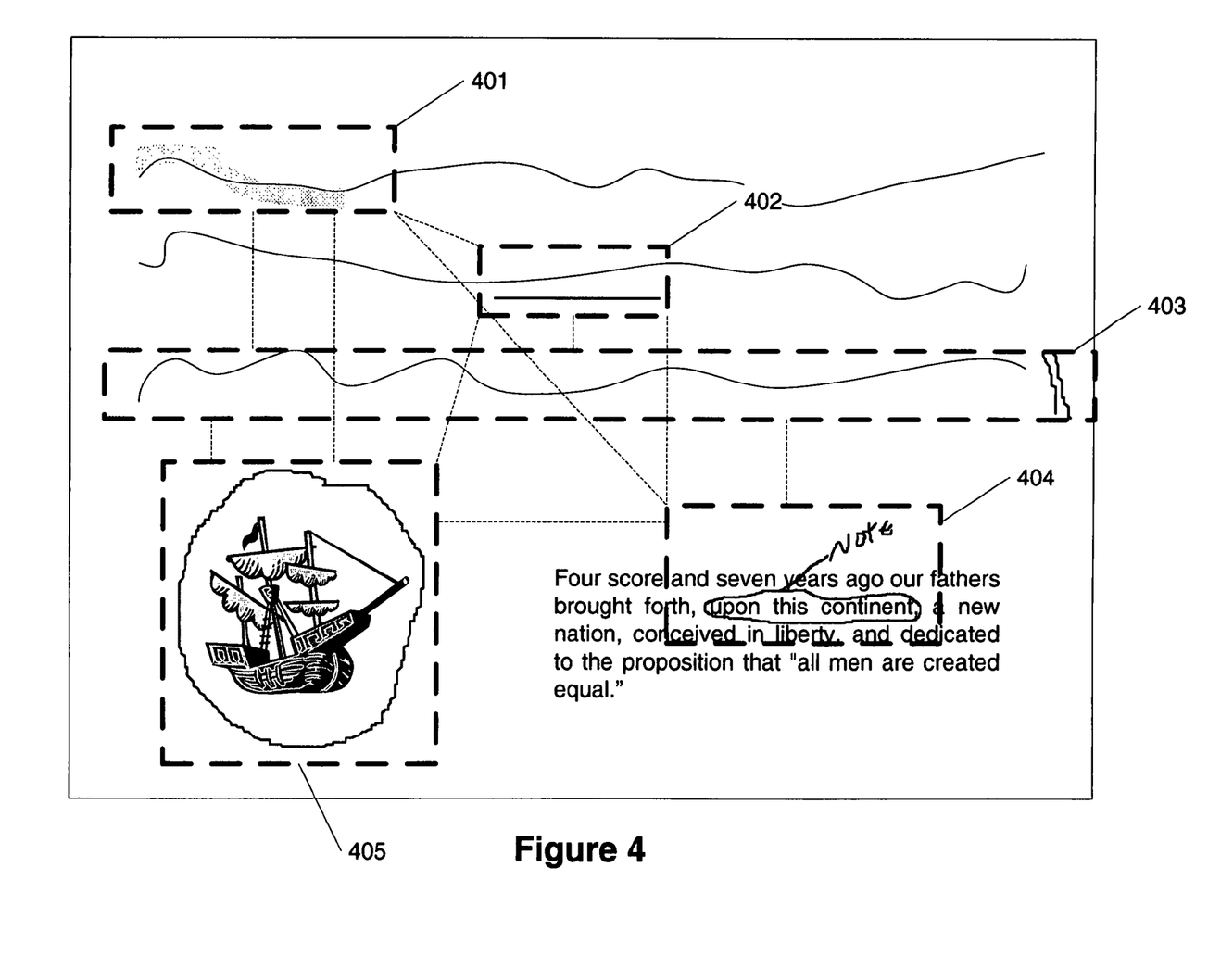
FIG. 4 shows information associated with each annotation being gathered in accordance with aspects of the present invention.

FIG. 4 shows information associated with each annotation being gathered in accordance with aspects of the present invention. Each annotation in FIG. 3 relates to content as described above. FIG. 4 shows the designation of context information relevant to each annotation. For instance, highlight 305 and a portion of ink 302 is designated by region 401. Region 401 may be a rectangle or any other shape. In general, region 401 is referred to as a bounding box in that it reflects the bounds of the combination of the annotation and underlying content.

A bounding box may or may not encompass all related content. For instance, for highlight 305, some of ink 302 may be captured in bounding box 401. Alternatively, all of ink 302 may be captured in bounding box 401. Bounding box 401 may be resized as needed to include as much or as little of underlying context as desired. The bounding box may be modified in shape depending on the type of annotation. Here, bounding box 401 contains some of ink 302 beyond the ends of highlight 305 but not all of ink 302. Likewise, underline 306 and a portion of ink 303 is designated by bounding box 402. Bounding box 403 is different in that it includes all of ink 304. Here, annotation 307 is a pair of margin bars. The system interprets the margin bars as referencing the horizontal stretch of ink 304. Of course, the horizontal selection in bounding box 403 may include more than one line as determined by whether bars 403 extend for more than one line. Bounding box 405 encompasses image 308 and loop 309. Bounding box 404 encompasses loop 311 and connected note 312.

In one aspect of the invention, bounding boxes 401-405 may be rendered to a user to show the user his annotations, thereby providing the user with a quick understanding of the relevant portions (according to him) of the document. All bounding boxes may be rendered separately. Alternatively, bounding boxes may be combined based on various criteria. For instance, the bounding boxes may be combined based on short distances between the bounding boxes. FIG. 4 shows distance determinations being made between each bounding box and its neighboring bounding boxes.

Figure 5:
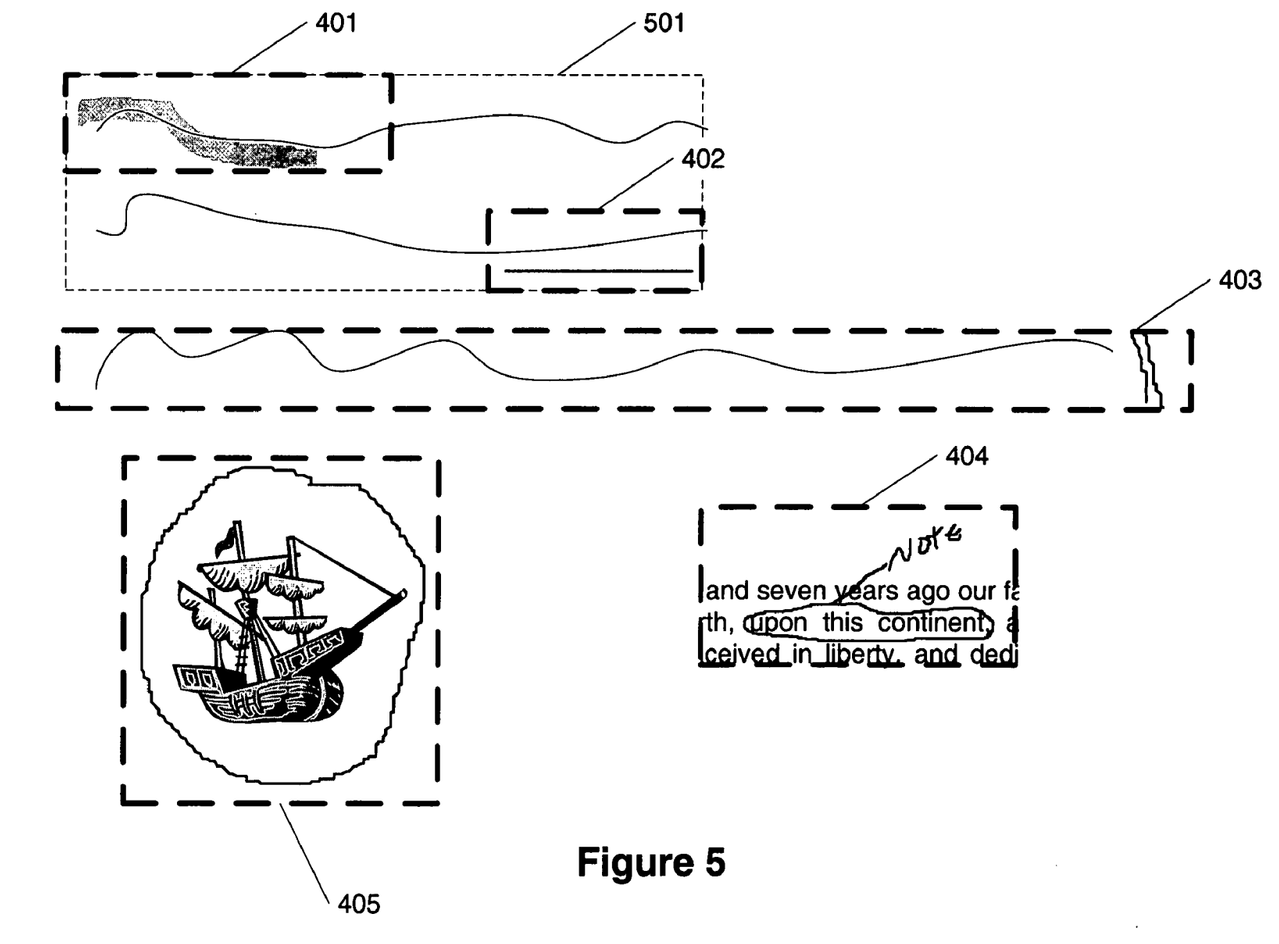
FIG. 5 shows grouping of annotations in accordance with aspects of the present invention.

FIG. 5 shows grouping of annotations in accordance with aspects of the present invention. Based on the distance determinations from FIG. 4, the system determines that the distance between bounding boxes 401 and 402 is within a threshold and groups bounding boxes 401 and 402 into a larger bounding box 501. Combining bounding boxes may be done based on distance determination, type of annotation, type of content having been annotated, user identification, tablet identification, pen identification used to make the annotation, and the like.

FIG. 5 shows the resulting annotations being displayed to a user with underlying contextual information in the bounding boxes. The bounding boxes may be ordered as appearing in the document or may be ordered based on other criteria. The bounding boxes may be presented as boxes, with or without borders. To further distinguish the bounding boxes with annotations and related context information, additional visual embellishments may be used including shadows and/or torn edges.

Aspects of the present invention may be implemented as a shell in an operating system. Alternatively, aspects of the present invention may be implemented as part of an application running on the operating system. When applied at an operating system level, aspects of the present invention permit clippings to be gathered across documents from different applications. For instance, one may highlight a first document in a web browsing application, underline a second document in a word processing application, circle data in a spreadsheet application, and add text and arrows to a mapping application.

Next, these various annotations may be shown together in a single view. Of course, more views may be permitted based on filtering. However, this example highlights at least one advantage of deploying aspects of the invention on a system-wide basis.

An illustrative process relating to an operating system-level clipping view may include creating an annotation and storing the data from the annotation in a location accessible by the operating system. Next, a user may start a user interface that allows the querying and filtering of the stored annotations. When the user requests a view of the annotations and context, the operating system builds a list of the annotations and context (referred to as clips) from the annotation data stored above.

Figure 6:
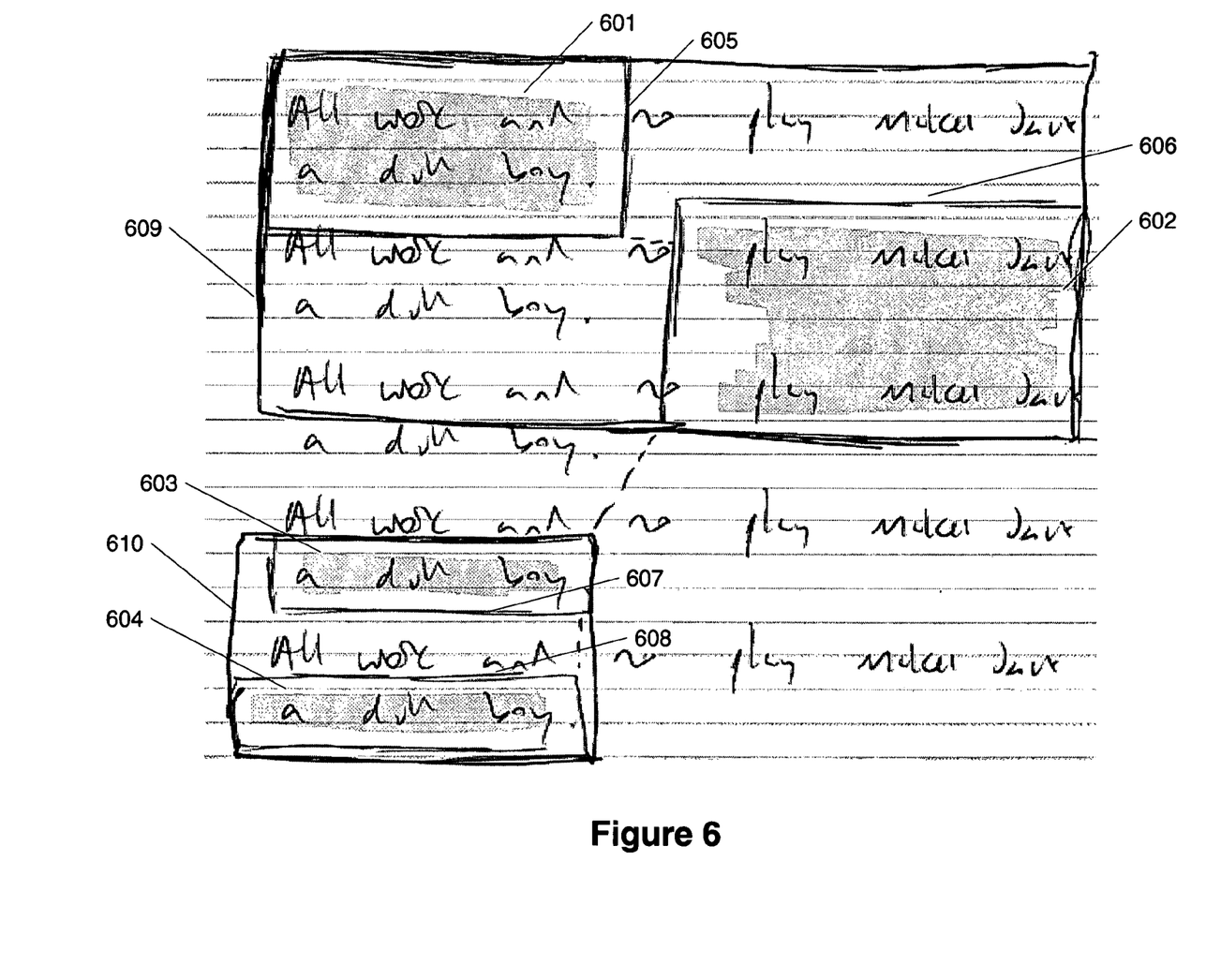
FIG. 6 shows annotations on electronic ink being grouped in accordance with aspects of the present invention.

FIG. 6 shows annotations on electronic ink being grouped in accordance with aspects of the present invention. Annotations may take a variety of forms. However, when the type annotation takes the same form as the context it is annotating, determination of what is context and what is an annotation can be difficult. In accordance with aspects of the present invention, what is considered to be an annotation may be determined based on the type of annotation, the shape of the annotation, the underlying context and the like. FIG. 6 shows a document in electronic ink. Highlights 601, 602, 603 and 604 may be considered annotations separate from the underlying ink document even though the difference between the highlight and the original ink may be as small as a user using a different color and/or a different width pen tip. Other distinctions may also be used to determine the nature of an ink stroke (content or annotation).

FIG. 6 shows bounding boxes 605 and 606 combined into bounding box 609 and bounding boxes 607 and 608 combined into bounding box 610. The resulting boxes 609 and 610 with context and annotations may be displayed.

The user may initiate the display of the annotations and context information by pressing a button or making another selection. Alternatively, an application may display the annotations and context information to the user when the user starts the application. Both approaches may be used together or separately.

Processes for Handling Annotations and Clips

Figures 7, 8:
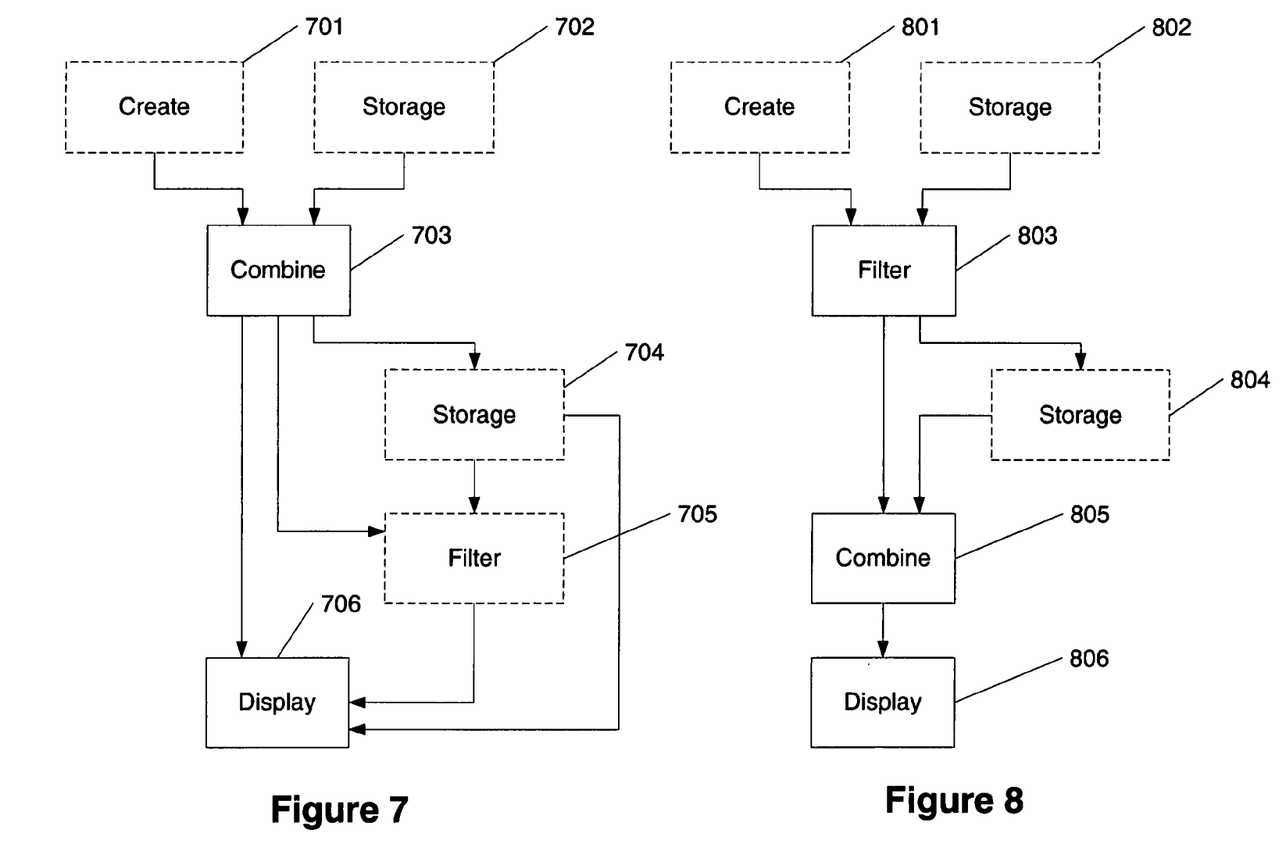
FIGS. 7 and 8 show processes for combining and displaying annotations in accordance with aspects of the present invention.

FIGS. 7 and 8 show processes for combining and displaying annotations in accordance with aspects of the present invention. FIG. 7 shows two steps: combine 703 and display 706. In step 703, annotations, context, and/or bounding boxes are reviewed to determine whether they may be combined. If so, they are combined, if not, they are left separate. In step 706, the annotations, context, and/or bounding boxes are displayed to the user. For purposes of description, the information shown to the user is referred to as clips.

FIG. 7 shows optional steps. The information that creates the annotations and/or context may be created by a user in step 701 and directly forwarded to step 703. Alternatively, annotations and/or context may have been previously created and stored. Step 703 may receive the information from storage 702.

After combining annotations and context, clips may be displayed as described above with reference to step 706. Alternatively, the clips may be stored in storage 704. The clips may then be filtered in accordance with filtering criteria (for example, the user may only want to see clips that contain red ink, highlights, certain words, certain shapes, and the like). The system may include the ability to perform handwriting recognition on annotations to determine if the annotations contain text and what the text is. This text may be searched in filtering step 705. Likewise, the system may be able to recognize various shapes and filter on these shapes in step 705.

In yet another aspect of the invention, storing in storage 704 may not be performed and only filtering step 705 be performed after combining step 703 and display 706. Whether or not storage 704 is used, combining before filtering provides the benefit of reducing the number of independent clips that need to be searched during filtering step 705.

It is appreciated that both steps 701 and 702 may be used when, for example, previously stored content from step 702 is used with new annotations from a user from step 701.

FIG. 8 shows an alternative process to that of FIG. 7. Here, the system filters in step 803 prior to combining in step 805 and displaying the clips in step 806. One advantage of filtering before combining is that it allows a user greater influence in what clips are combined and shown. For instance, if a user only wants to have clips of one highlighting color shown, then filtering before combining eliminates non-selected highlights from the clips to be shown to the user.

Optional steps are also shown in FIG. 8. First, the input to filtering step 803 may come from a user having created the annotations and/or context in step 801 or may come from a storage where previously stored annotations and/or content resides in step 802. It is appreciated that both steps 801 and 802 may be used when, for example, previously stored content from step 802 is used with new annotations from a user from step 801.

Figure 9:
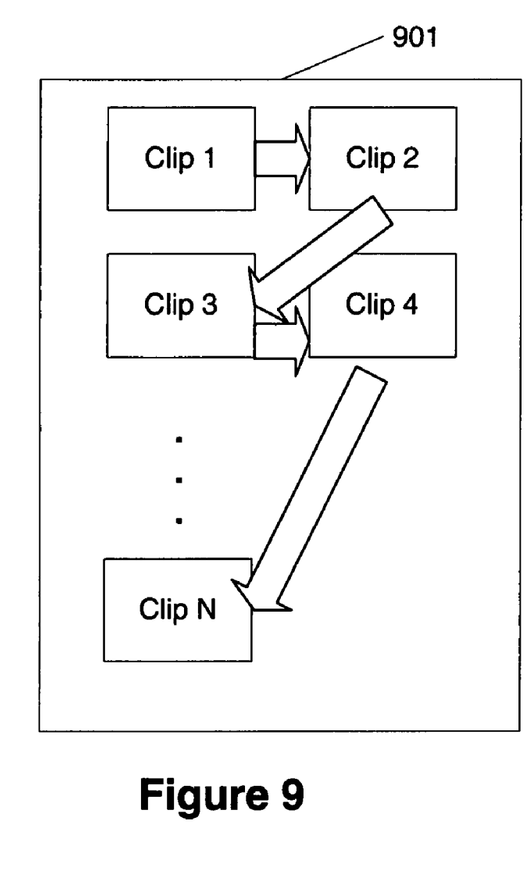
FIGS. 9 and 10 show orderings of clips of annotations in accordance with aspects of the present invention.
Figure 10:
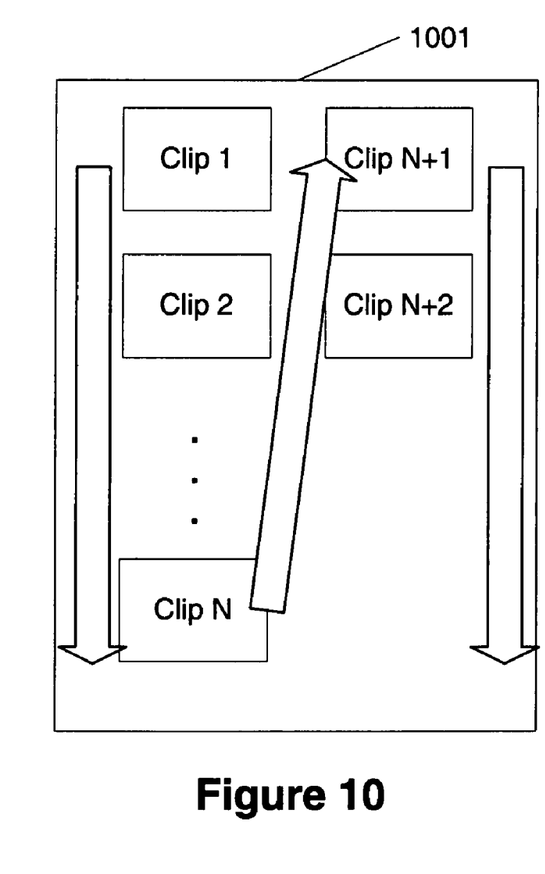

FIGS. 9 and 10 show orderings of clips of annotations in accordance with aspects of the present invention. In FIG. 9, clips are displayed in region 901. The clips 1-N are displayed in a raster pattern. Any number of columns may be used. A single column provides the ability to only need to look in a single direction to find clips. Multiple columns can be more efficient in providing the clips to a user who is using them to obtain an overall idea of the relevance of the document. In FIG. 10, the clips are arranged in two columns. Here, one may need to scroll to the bottom of the displayed region 1001 to read all of clips 1-N then need to scroll back up to the beginning to start reading the next column of clips (clips N+1 and N+2).

Clips and Links

Clips may be used to provide information regarding the annotations in a document. Alternatively, clips may also be used to link the user back to the region of the document from which the clip was created. A set of displayed clips may come from one or more documents from one or more applications. Links associated with the clips may refer back to those documents across the applications.

Figure 11:
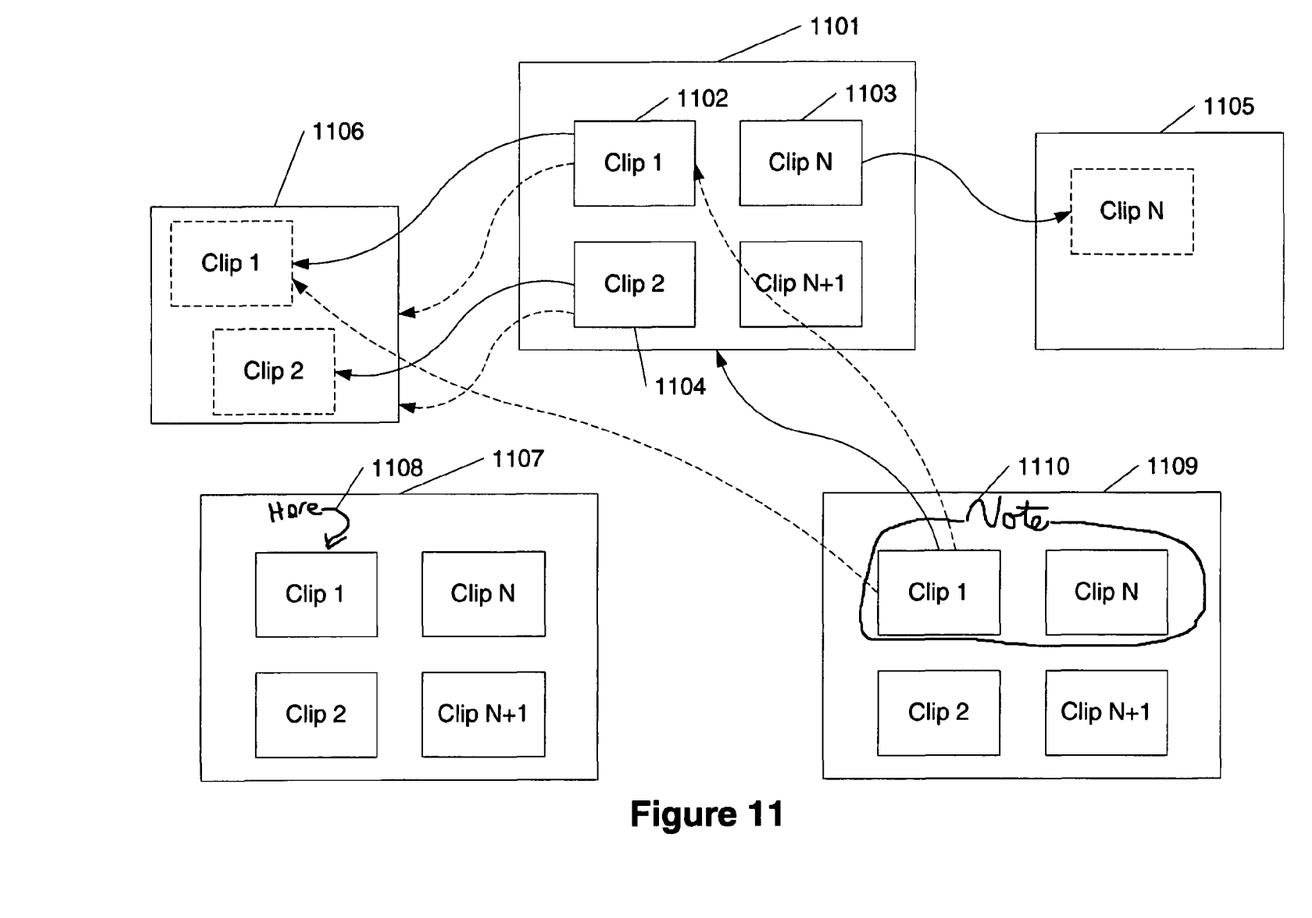
FIG. 11 shows various levels of links in accordance with aspects of the present invention.

FIG. 11 shows various levels of links in accordance with aspects of the present invention. Displayed region 1101 includes clips 1, 2, N, and N+1. These clips may not link to any documents, may link to one document, or may link to multiple documents. Here, clip 1 1102 links to a relevant portion of document 1106 from which clip 1 1102 originates. Similarly, clip 2 1104 may link to a relevant portion of document 1106 from which clip 2 1104 originates. Alternatively, as shown by broken arrows, the clips 1 1102 and 1104 may link to the document 1106 in general.

To show different documents being linked by clips shown in region 1101, clip N 1103 may link to document 1105.

FIG. 11 also shows displayed regions 1107 and 1109. In both of these regions, clips 1, 2, N, and N+1 are shown. Here, however, annotations are made on the existing clips as annotation 1108 in region 1107 and annotation 1110 in region 1109. Multiple sets of links may or may not exist. First, no links may be permitted based on annotated clips. So, for instance, activating clip 1 in region 1107 with annotation 1108 may not link to any location. Second, a first level of linking may be permitted. As shown by the solid arrow from clip 1 with annotation 1110 in region 1109, the clip 1 may link generally to the previous set of clips in region 1101. Alternatively, as shown by the broken arrow from clip 1 of region 1109, the clip 1 may link to the portion of region 1101 from which clip 1 originates. Third, the system may support unlimited levels of linking. For instance, the link from clip 1 in region 1109 may point to document 1106, the origin of the context and annotation for clip 1.

Figure 12:
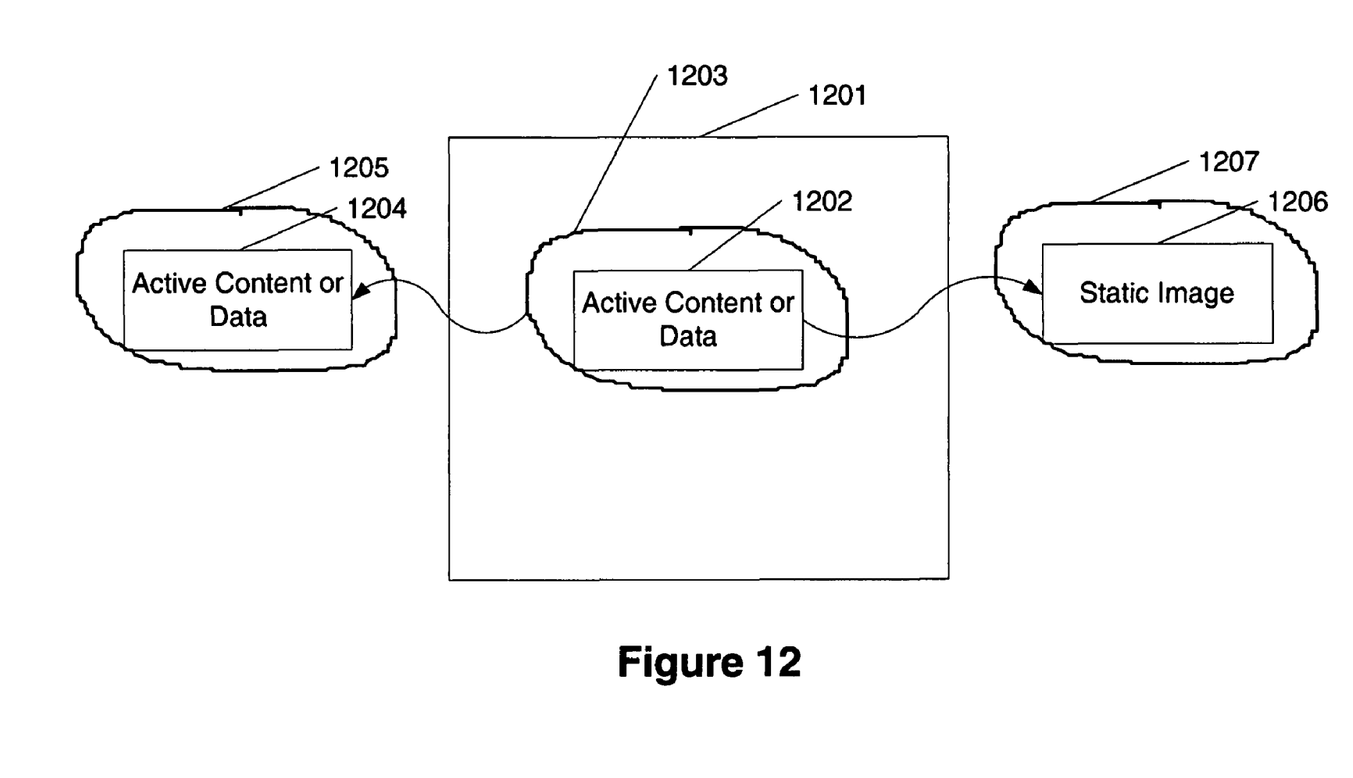
FIG. 12 shows an illustration of active content being annotated in accordance with aspects of the present invention.

FIG. 12 shows an illustration of active content being annotated in accordance with aspects of the present invention. Web pages and other documents may include content that changes over time. In some instances, the pages themselves change. In other instances, they include content that may be only temporarily visible to the user, yet nonetheless relevant and annotatable. FIG. 12 includes a web page 1201 with active content or data 1202. The page 1201 includes annotation 1203 that annotates the active content or data 1202. At least two options are possible to maintain the context of the annotation. In a first example, the system may capture a static image of the content 1206 (as a bitmap, JPEG, GIF, PDF, EPS, or other format) and may keep the image of the content 1206 available for display as a clip including annotation 1207. In a second example, the active content 1202 may be captured and stored locally to allow the content 1204 to be associated with an annotation 1205. This may include downloading the current active content or maintaining a link to the content that was displayed at the time of annotation.

User Interfaces

Figure 13:
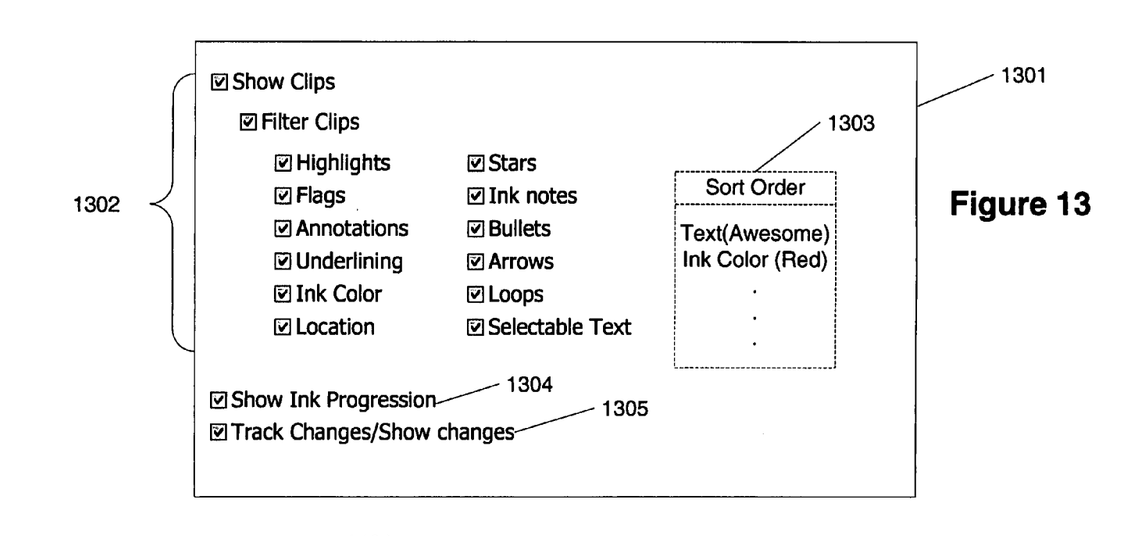
FIG. 13 shows a user interface in accordance with aspects of the present invention.

FIG. 13 shows a user interface in accordance with aspects of the present invention. A user interface 1301 is provided that allows various selections of the content. The ability to show clips, filter clips and what to filter clips on is shown in region 1302. The filtering criteria may include highlights flags, annotations, underlining, ink color, location, stars, ink notes, bullets, arrows, loops, and selectable text. Region 1303 shows a user interface that permits one to select the sort order of the annotations.

Data Structures

Figure 14:
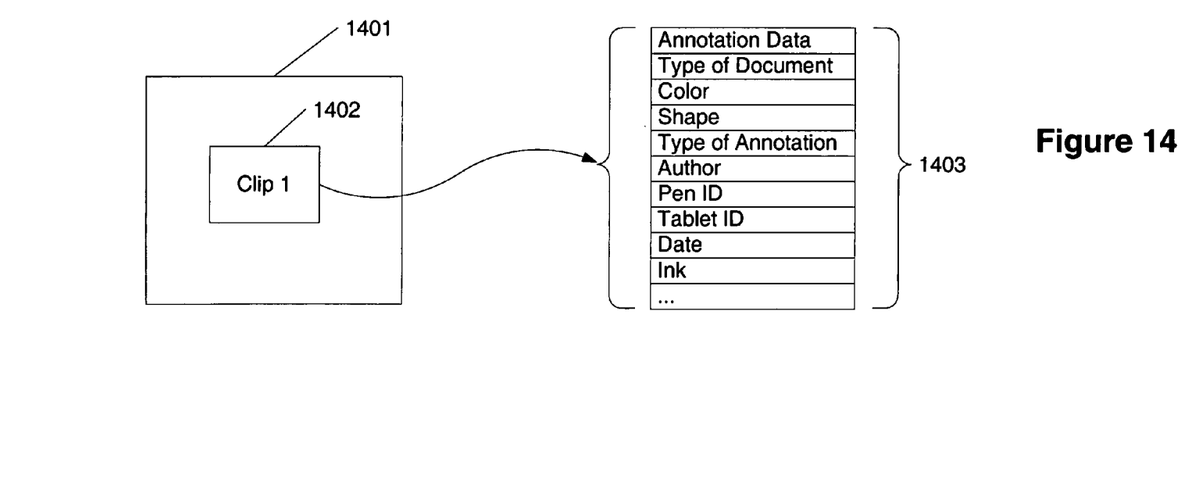
FIG. 14 shows information stored with relation to an annotation in accordance with aspects of the present invention.

FIG. 14 shows information stored with relation to an annotation in accordance with aspects of the present invention. A clip 1402 may be shown in region 1401. The clip 1402 may be stored in a variety of formats including HTML, XML, and other formats. The content of each clip may be represented by the following items 1403:

Annotation data (may include electronic ink);
  Type of document;
  Color;
  Shape;
  Type of Annotation;
  Author;
  Pen ID;
  Tablet ID;
  Date created;
  Date modified; and
  Link or storage of context.

Aspects of the present invention have been described in terms of illustrative embodiments thereof. Numerous other embodiments, modifications and variations within the scope and spirit of the appended claims will occur to persons of ordinary skill in the art from a review of this disclosure.

We claim:

1. A method of displaying clips comprising the steps of:
   receiving a first display region that is an extracted portion of a first document, wherein the first display region is visibly designated by a first resizable bounding box within the first document, and wherein the first display region includes an image of an annotation and related content encompassed by the first resizable bounding box within the first document;
   receiving a second display region that is an extracted portion of a second document, wherein the second display region is visibly designated by a second resizable bounding box within the second document, and wherein the second display region includes an image of an annotation and related content encompassed by the second resizable bounding box within the second document;
   combining said first display region and said second display region into a single clip to form a combination of the extracted portions of the first document and the second document;
   filtering said single clip;
   rendering a resultant image having said clips, wherein one of said clips is the single clip having the filtered combination of the extracted portions of the first document and the second document, and wherein said resultant image includes the images of the annotations and related content encompassed by said first resizable bounding box and said second resizable bounding box; and
   displaying the clips including the single clip having the filtered combination of the extracted portions of the first document and the second document.

2. The method according to claim 1, further comprising the step of:
   storing said single clip as said combination of said at least two display regions.

3. The method according to claim 1, wherein said annotations are from different documents.

4. The method according to claim 3, wherein said documents are from different application programs.

5. A computer-readable medium having a program stored thereon, said program for displaying clips and comprising the steps of:
   receiving at least two display regions of one or more documents wherein each display region includes an image of an annotation and related content encompassed by that display region within the one or more documents, the at least two display regions being extracted from non-contiguous portions of the one or more documents;
   combining said at least two display regions to form a single clip consisting of noncontiguous portions of the one or more documents;
   filtering said single clip of said at least two display regions using specified filtering criteria, said filtering including performing handwriting recognition on annotations in order to search recognized text and determine whether annotations contain text that meets the specified filtering criteria;
   rendering a resultant image having said clips, wherein at least one of said clips is the single clip having the filtered combination of said at least two display regions, and wherein said resultant image includes the images of the annotations and related content encompassed by said at least two display regions; and
   displaying the clips including the single clip having the filtered combination of said at least two display regions.

6. The computer readable medium according to claim 5, further comprising the step of storing said single clip as a combination of said at least two annotations and related content.

7. A system for displaying clips of content and annotations comprising:

an input for receiving a plurality of annotations, each annotation is associated with a specific content portion of the document being annotated;

the specific content portions having active content within the document that is non-static, and the active-content is maintained by downloading current active content to a local stored copy;

a processor executing instructions from a computer readable medium;

the processor producing a subset of annotations by filtering annotations using specified filtering criteria, said filtering including performing handwriting recognition on annotations in order to search recognized text and determine whether annotations contain text that meet the specified filtering criteria;

the processor rendering an image having clips, wherein at least one of said clips comprises an annotation from the subset with the associated specific content portion, and at least one of said clips comprises a combination of two or more filtered annotations from the subset, with their associated content portions;

wherein the processor creating the combination by:

encompassing a first content and an associated annotation from the subset in a first bounding box, encompassing second content and an associated annotation from the subset in a second bounding box, wherein the first and second bounding boxes are non-contiguous, calculating distance determinations between the first and second bounding boxes, and determining that when the bounding boxes are within a threshold distance from each other, the bounding boxes are identified for grouping and combining;

combining the first bounding box and the second bounding box to produce the combined bounding box containing the combination of annotations from the subset and their associated content portions to form one of the clips containing combined content, and outputting said rendered image containing said at least one clip comprising an annotation from the subset with its associated specific content portion, and said at least one clip comprising the combination of two or more annotations from the subset with their associated content portions.

* * * * *